D. J. WHITE.
LOCK NUT.
APPLICATION FILED AUG. 9, 1920.
1,355,373.
Patented Oct. 12, 1920.
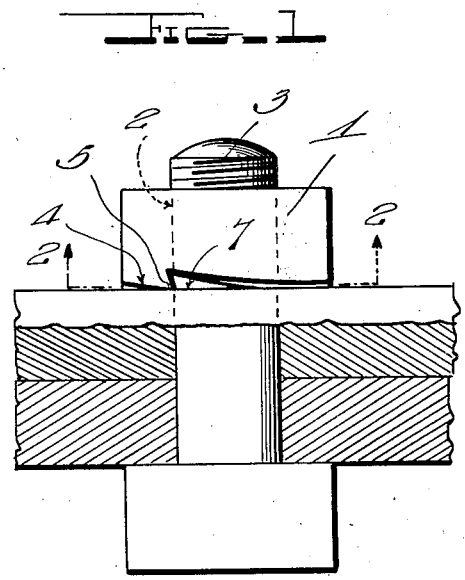
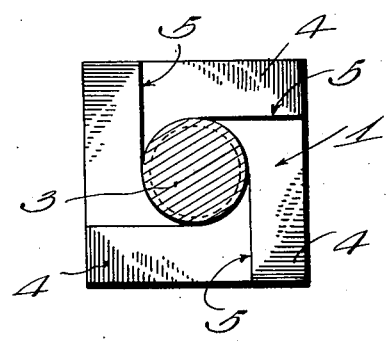
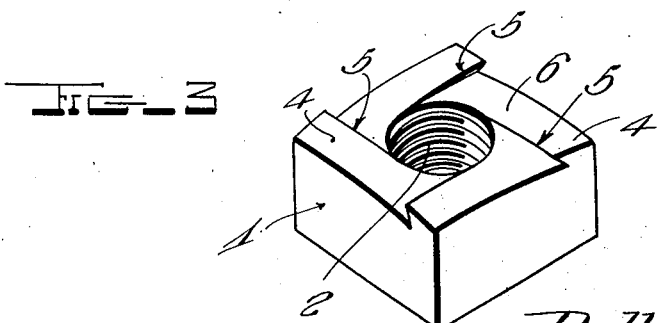
Inventor
Dell J. White
By H. B. Wilson & Co.
Attorneys
Witness

UNITED STATES PATENT OFFICE.

DELL JOSEPH WHITE, OF GREEN BAY, WISCONSIN.

LOCK-NUT.

1,355,373.  Specification of Letters Patent.  Patented Oct. 12, 1920.

Application filed August 9, 1920. Serial No. 402,135.

*To all whom it may concern:*

Be it known that I, DELL J. WHITE, a citizen of the United States, residing at Green Bay, in the county of Brown and State of Wisconsin, have invented certain new and useful Improvements in Lock-Nuts; and I do declare the following to be a full, clear, and exact description of the invention, such as will enable others skilled in the art to which it appertains to make and use the same.

This invention relates to an improved lock-nut.

The principal object of the invention is to provide a nut which is provided on one of its flat faces with a plurality of shoulders arranged tangentially with respect to the screw-threaded aperture, these shoulders being provided on their inner longitudinal edges with cutting edges adapted to engage the member against which the nut is placed, there being a clearance space formed between the nut and the member which it is placed against to insure effective engagement of the cutting edges with the member.

Other objects and advantages of the invention will be apparent during the course of the following description.

In the accompanying drawing forming a part of this specification and in which like numerals are employed to designate like parts throughout the same:

Figure 1 is an elevational view of a nut constructed in accordance with my invention showing the manner in which the same is used.

Fig. 2 is a sectional view taken on the line 2—2 of Fig. 1.

Fig. 3 is an inverted perspective view of the nut.

The body 1 of the improved nut may be square or of any other shape, it being provided with the usual centrally disposed screw-threaded aperture 2 which engages the screw-threads of an ordinary bolt 3. One of the flat faces of the nut is cut away in the manner disclosed to provide a plurality of shoulders 4 which extend tangentially from the aperture 2. These shoulders are reduced in thickness toward their inner ends, at which ends they abut the adjacent shoulders. An undercut or groove is formed in the longitudinal inner edges of the shoulders to provide cutting edges 5 which are adapted to bite into the member against which the nut is screwed. To insure effective engagement of the cutting edges with said member, the shoulders are beveled outwardly from the cutting edges toward the sides of the nut in the manner shown. By beveling the shoulders in this manner and reducing them in thickness in the manner already described, it will be seen that clearance space 7 will be provided between the underface of the nut and the member against which it is screwed. At this point I wish to mention that I am fully aware of a patented nut-lock provided on one of its flat faces with a plurality of cutting edges somewhat similar to my nut. However, I wish to point out that the construction of my nut is decidedly different from the patented nut under consideration, since the clearance spaces which I provide insure effective engagement of the cutting edges with the member against which the nut is placed which is another unobtainable feature so far as the prior art device is concerned.

From the foregoing description, it will be seen that I have devised a nut-lock which is not only simple in construction but is decidedly more advantageous and effective in operation than other similar devices. Furthermore, the operation of my improved nut-lock is automatic and when once in place, there is little or no possibility of it becoming accidentally loosened.

A careful consideration of the foregoing description taken in connection with the accompanying drawing will enable persons skilled in the art to which this invention appertains to obtain a clear understanding of the same, therefore, a more lengthy description is deemed unnecessary.

Since probably the best results may be obtained from the construction shown and described, this construction is to be taken as the preferred embodiment of the invention. However, I wish it to be understood that minor changes in the shape, size, and arrangement of parts may be resorted to without departing from the spirit of the invention or the scope of the subjoined claim.

I claim:

A lock-nut comprising a body provided with a centrally disposed screw-threaded aperture and being cut away on one of its flat faces, thus forming a plurality of shoulders disposed tangentially with respect to said aperture and at right angles to the adjacent shoulders which it then abuts, each shoulder being reduced in thickness toward its inner end, the longitudinal inner edges of the shoulders being undercut to form cutting edges which extend in parallelism with the sides of the body, said shoulders also being beveled outwardly from said cutting edges toward the sides of the body, substantially as described and for the purpose set forth.

In testimony whereof I have hereunto set my hand in the presence of two subscribing witnesses.

DELL JOSEPH WHITE.

Witnesses:
E. A. PLUMB,
JENNIE OSMOND.